(12) United States Patent
With

(10) Patent No.: US 6,374,751 B1
(45) Date of Patent: Apr. 23, 2002

(54) PORTABLE ACTIVITY SURFACE

(76) Inventor: Jere L. With, 6666 Caminito Sinnecock, La Jolla, CA (US) 92037

( * ) Notice: Subject to any disclaimer, the term of this patent is extended or adjusted under 35 U.S.C. 154(b) by 0 days.

(21) Appl. No.: 09/626,064

(22) Filed: Jul. 26, 2000

(51) Int. Cl.⁷ .............................................. A47B 23/00
(52) U.S. Cl. ........................................ 108/43; 100/90
(58) Field of Search ............................ 100/43, 44, 45, 100/90, 143, 137, 93, 70, 73

(56) References Cited

U.S. PATENT DOCUMENTS

| | | | |
|---|---|---|---|
| 2,556,943 A | * 6/1951 | Reisman | 108/90 |
| 3,701,576 A | * 10/1972 | Moen | 108/43 |
| 3,922,973 A | * 12/1975 | Sturgeon | 108/44 X |
| 4,765,583 A | * 8/1988 | Tenner | 108/43 X |
| 5,381,717 A | * 1/1995 | Brokaw | 108/43 X |
| 5,692,815 A | * 12/1997 | Murphy | 108/43 X |
| D404,218 S | 1/1999 | Sussman | |
| D404,219 S | 1/1999 | Patterson | |
| 5,862,933 A | 1/1999 | Neville | |
| D408,388 S | 4/1999 | Wiggins | |
| D408,649 S | 4/1999 | Bucklitzsch et al. | |
| 5,893,540 A | * 4/1999 | Scott | 108/43 X |
| 5,915,561 A | 6/1999 | Lorenzana et al. | |
| 5,927,210 A | 7/1999 | Hacker | |
| D413,209 S | 8/1999 | Jarke | |
| 5,951,128 A | 9/1999 | Aidone et al. | |
| 6,003,446 A | 12/1999 | Leibowitz | |
| D418,327 S | 1/2000 | Sullins et al. | |
| 6,044,758 A | 4/2000 | Drake | |
| 6,050,200 A | 4/2000 | Sullins et al. | |
| 6,062,522 A | 5/2000 | Svegliato | |
| 6,164,213 A | * 12/2000 | Topps et al. | 108/43 |

* cited by examiner

*Primary Examiner*—Jose V. Chen
(74) *Attorney, Agent, or Firm*—The Maxham Firm

(57) ABSTRACT

A portable and adjustable activity surface for use by a wide variety of individual users and that can accommodate a wide range of different activities thereon. The device has a support pad with a resting surface, a forward surface, a rearward surface and a sloping surface. The device also has a platform that contacts the sloping surface. The height of the platform can be increased by moving the platform up the sloping surface, and the height of the platform can be decreased by moving the platform down the sloping surface. The platform remains in contact with the support pad either by frictional forces or with hook-and-loop fasteners. Methods are also provided for making and using the activity surface.

20 Claims, 4 Drawing Sheets

PORTABLE ACTIVITY SURFACE

BACKGROUND

1. Field of the Invention

The present invention generally relates to a portable, adjustable, multipurpose activity surface. More specifically, it relates to such an activity surface adapted for use on a person's lap or on any relatively flat or stable surface.

2. Discussion of the Related Art

There are currently several devices available for performing activities on an individual's lap or at a computer station. However, such devices suffer from limitations of size and ease of use, because they are not adaptable to a wide variety of different individual preferences and ergonomic positions.

For example, most current devices are intended for single or limited uses, such as for the manipulation of a computer mouse and similar small objects (see U.S. Pat. No. 6,062,522). Thus, such devices are unworkable for a broad scope of activities. Some other available devices are commonly referred to as lap trays. However, devices such as these are either non-adjustable (see U.S. Pat. No. 6,050,200) or they are cumbersome, having legs and the like (see U.S. Pat. No. 6,044,758). Still other lap trays have recesses and pockets for holding objects such as food and drink (see U.S. Pat. No. 5,915,561). Although the use of straps is one attempt to solve the problem of adapting the tray to a wide variety of uses and individual preferences, such straps are often uncomfortable and somewhat restraining for the individual. One attempt to solve the problem of adapting the tray to the legs of an individual is to use a contoured area on the bottom for receiving the legs of the user (see U.S. Pat. No. 6,003,446). However it is still desirable to have a bottom that is adaptable to an individual's legs as well as a wide variety of other surfaces.

Several devices are also heavy, being constructed of wood, or are cumbersome, having compartments, housings, receptacles, projections, legs or handles which make them time-consuming to set up, generally inconvenient to use or adjust, and difficult to quickly put aside. Still other devices are configured with strapping or belting (see U.S. Pat. No. 5,862,933), which are confining to use, and otherwise restrict body positions.

Yet other devices are complicated in design with rigid movable parts requiring either screws, hinges, hooks, brackets, slots or other attaching or enabling mechanisms, making them costly to design, manufacture and build. This expense is then passed on to the consumer in higher retail prices. Some devices have legs or vertical supporting members that restrict the device's use by requiring a conforming support for the legs or vertical supporting members. Since they are mostly designed to rest adjacent to and outside the thighs, they also prevent the user's legs from naturally splaying in a comfortable position.

Most devices are also devoid of sufficient padding between the lap and the bottom of the device, making them uncomfortable to use when placed on the lap, especially for long periods of time. In addition, the devices currently available are limited in their ergonomic utility, requiring the user to adjust to the device's orientation rather than being able to fully adjust the device to serve the intended use whatever the user's body position. That is, the devices are designed to usually rest on or above the lap. But the lap itself may be up-sloping or down-sloping, depending on the physiology or posture of the user. The result is the activity surface is in the same front-to-back orientation, sloping upward or downward. This most often is not the ideal configuration for performing the intended activity and usually results in an inappropriate adaptation of the body. Those devices with legs or vertical supporting members are subject to the geometry of that upon which the user is seated and can pose even more ergonomic problems. Moreover, many of the devices arguably create or exacerbate the ergonomic anomalies they intend to alleviate. Thus, the user is required to negotiate lips, ridges and other contours that can form pressure points between the device and the user's upper extremities or require the user's upper extremities to be used while not adequately supported.

Thus, there exists a need for a portable activity surface that is adjustable to accommodate various user physiologies and postures and at the same time is comfortable and adaptable to a variety of purposes or tasks. Ideally the device will be adapted for use on a person's lap and will be adjustable through a wide variety of positions while large enough to accommodate a wide range of different activities and users. The present invention satisfies these needs and provides related advantages as well.

SUMMARY OF THE INVENTION

The present invention provides an adjustable activity surface having a support pad of a generally triangular or wedge configuration that has a resting surface, a forward surface, a rearward surface and a sloping surface. The activity surface also has a platform adapted to removeably mount on the sloping surface. The height of the platform can be increased by moving the platform up the sloping surface. The height of the platform also can be decreased by moving the platform down the sloping surface, thereby providing adjustment of the platform to accommodate individual physical sizes and preferences.

The present invention also provides an adjustable activity surface where the support pad has a resting surface, a forward surface and a sloping surface. There is a platform adapted to contact and be supported on the sloping surface and its height can be increased by moving the platform up the sloping surface, or its height can be decreased by moving the platform down the sloping surface.

In additional embodiments, the support pad and the platform are held in contact by friction or hook-and-loop fastening means. The activity surface can also have attachment means for securing objects to the platform. The attachment means can be elastic or rubber bands, nylon rope or leather belts. There can also be a lap belt or lap strap securing the device to the user's lap. In additional embodiments, the platform can be made of a magnetic material, or it can be a dry erase white board.

The invention also provides methods for making and using the activity surface by taking a support pad having a resting surface, a forward surface, a rearward surface and a sloping surface; contacting a platform with the sloping surface; placing the activity surface on an individual's lap; removing the platform from the sloping surface of the support pad; moving the support pad either toward or away from the individual; and repositioning the platform on the sloping surface of the support pad, wherein an activity surface is provided that can be adjusted to a position that accommodates the size and preference of the individual.

BRIEF DESCRIPTION OF THE DRAWINGS

The above and other object and advantages of the present invention will become apparent from the following description when read in conjunction with the accompanying drawings.

DETAILED DESCRIPTION OF THE PREFERRED EMBODIMENT

The present invention provides a simple, smooth activity surface that is even, lightweight, padded, adjustable, and customizable for performing a myriad of tasks by combining a platform 10 with a cushion or support pad 20 that can be removably placed or attached by means of friction or hook-and-loop fastening means, for example VELCRO®, so that the top of the support pad may be placed anywhere along the underside of the platform, thus making it widely adjustable. Movement of the platform and support pad with respect to each other is indicated, for example, by arrow "a" in FIG. 1a.

More specifically, as used herein, a "platform" refers to a preferably lightweight, rectangular rigid sheet, having rounded corners, with smooth planar surfaces and a thin, uniform thickness, sized to accommodate most typical desk or table-based activities, while at the same time distributing the weight of such activity over a relatively large area. In a further preferred embodiment, the platform is constructed from plastic and is approximately twenty inches by eighteen inches with a thickness of one-eighth to one-quarter inch. The selection of the various dimensions is made in order to achieve strength with relatively light weight and also to provide a large enough work surface that is at the same time not too cumbersome. One skilled in the art understands that the selection of other dimensions that achieve the same results would be within the scope of this invention as well.

Stability between the components of the device are provided herein. For example, hook strips of a hook-and-loop fastening means are preferably attached to the platform's underside perpendicular to its longitudinal axis. However, the placement of the fastening means can be in any other configuration, such as parallel to the longitudinal axis, or randomly located thereon, as long as the platform remains stable. Additionally, it is contemplated herein that stability between the platform and the support pad may be accomplished merely by the means of frictional forces alone. For example, if the support pad is covered with a rubberized material, then the platform would be less likely to move or slip. One skilled in the art understands that the degree of stability is proportional to, in part, friction between the platform and the support pad, and further that the selection of particular fabrics and materials for a support pad fabric cover, if desired, would be made to achieve a desired degree of friction and consequent stability.

Figure 1A:
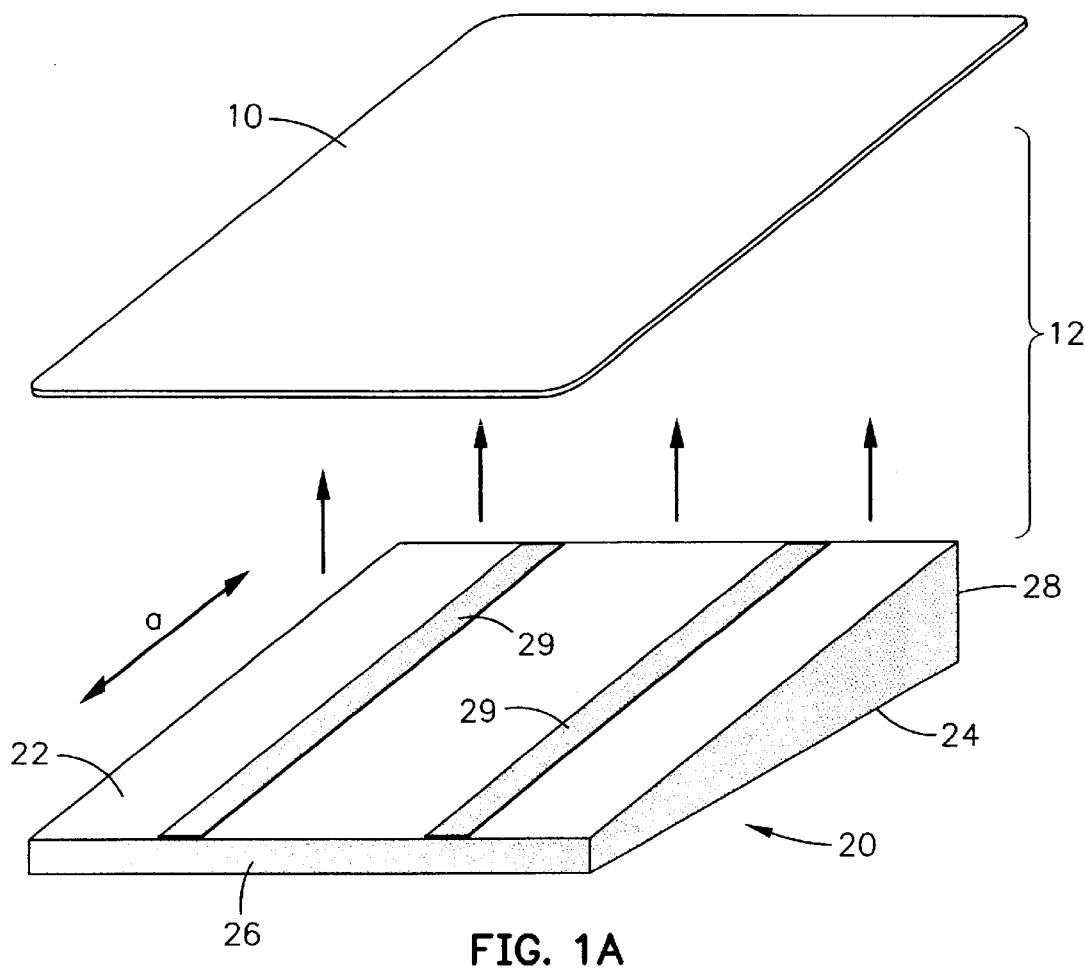
FIG. 1a shows the device of the present invention in a disassembled state.
Figure 1B:
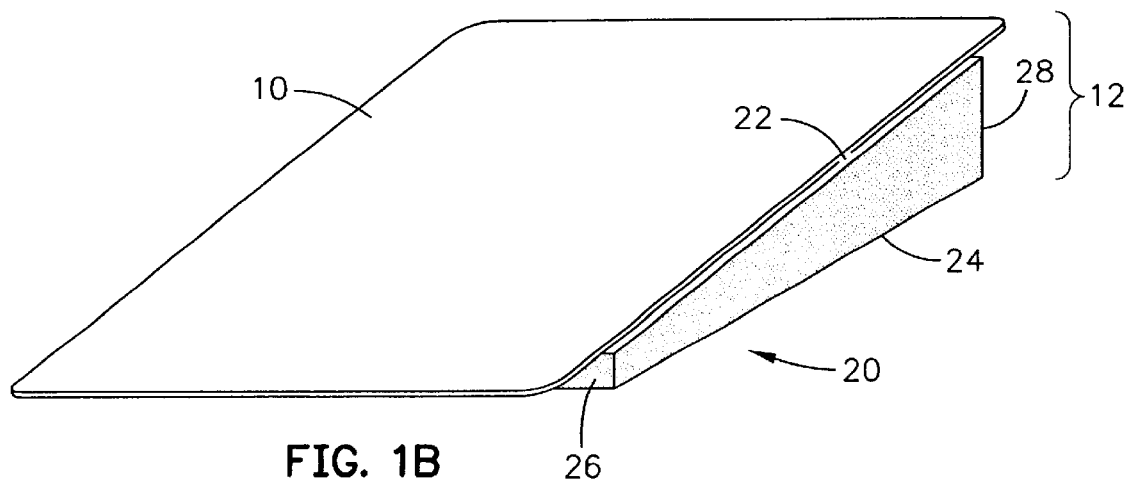
FIG. 1b shows the device of the present invention in an assembled state.

Also as used herein, a "support pad" is used interchangeably with a cushion and is preferably made from a foam or polymer fiber encased in a form-fitting fabric. If desired, the support pad need not have a fabric cover. As seen in FIGS. 1a and 1b, the general geometry of the support pad is wedge-shaped, having resting surface 24, which is preferably flat, and its top forming sloping surface 22, which slopes from its thickest edge to its corresponding thinnest edge. For example, support pad 20 can have a forward edge 28, which is positioned away from the individual. Forward edge 28 may be disposed perpendicular to resting edge 24, or it may form an acute angle with respect to resting edge 24, or the angle may be greater than ninety degrees, depending on aesthetic, ergonomic or economic considerations. Also, preferably, the support pad has rearward surface 26 that is generally in an upright direction and parallel to forward surface 28. However, one skilled in the art understands that the rearward surface 26, and also forward surface 28 can be disposed at other angles and need not be parallel to one another. Forward surface 28 is preferably higher than rearward surface 26 in order to provide a slope to sloping surface 22.

Additionally, the length of support pad 20 is preferably less than the length of platform 10, allowing support pad 20 to be placed at different positions underneath platform 10 when the longitudinal ends of platform 10 and support pad 20 are aligned. Thus, the surface area of platform 10 is preferably greater than that of the contact area of support pad 20. It is also contemplated herein that there may be more than one support pad, preferably arranged parallel to one another and with their sloping surfaces pointing in the same downward or upward direction.

Figure 4:
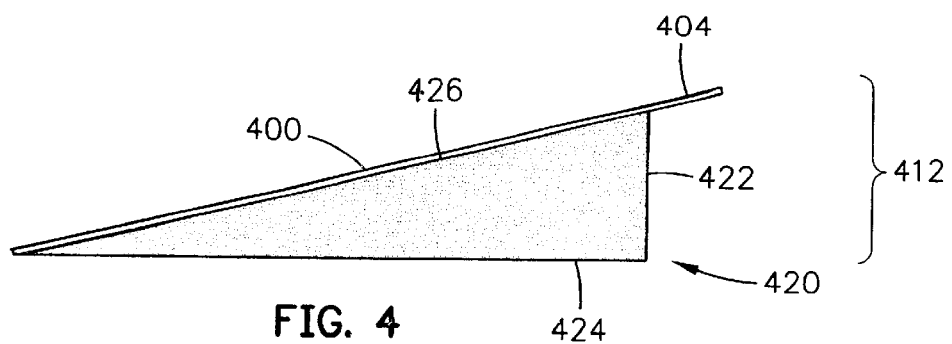
FIG. 4 shows a side view of the platform where the support pad has a forward surface, a sloping surface and a resting surface, but no rearward surface.

The activity surface of the present invention may also be constructed as described in FIG. 4. In this embodiment, activity surface 412 has platform 400 with leading edge 404 but no trailing edge. This is because support pad 420 has sloping surface 426, forward surface 422 and resting surface 424, but no rearward surface.

Figure 2A:
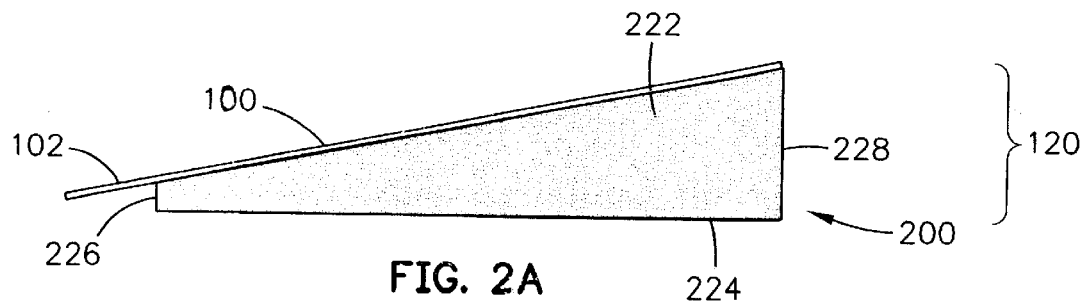
FIG. 2a shows a trailing edge of the platform extending below the support pad.
Figure 2B:
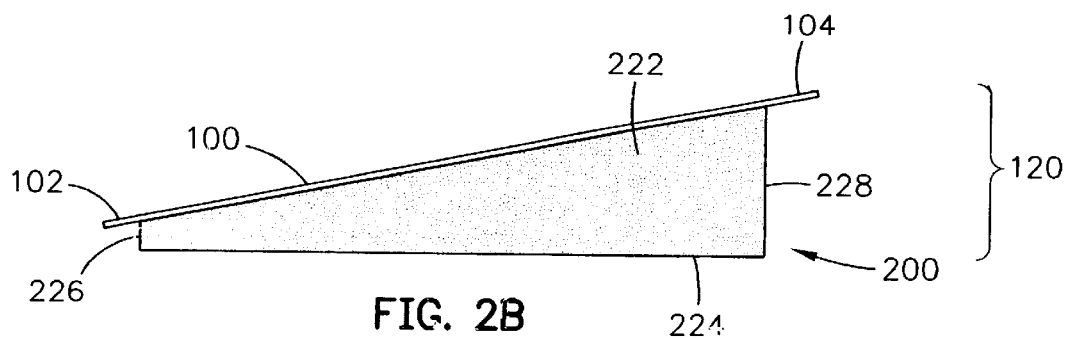
FIG. 2b shows a position of the platform on the support pad where the trailing edge and leading edge of the platform extend beyond the rearward surface and forward surface of the support pad, respectively.
Figure 2C:
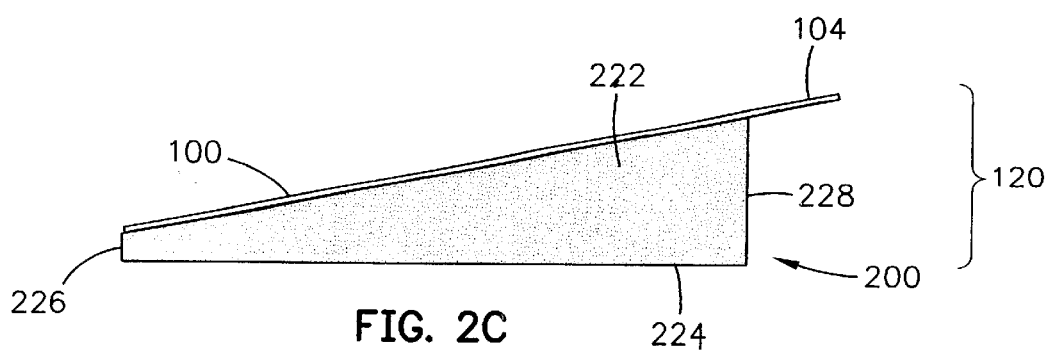
FIG. 2c shows a position of the platform on the support pad where the leading edge of the platform extends beyond the forward surface of the support pad.

As seen in FIGS. 2a, 2b and 2c, when support pad 200 and platform 100 are assembled, movement of support pad 200 vis-a-vis platform 100 either raises or lowers the platform. Rearward surface 226 and forward surface 228 are also shown here. This adjustability is unique to activity surface 120 and allows a wide range of individuals to use the device for a wide range of activities. As described herein, platform 100 may be moved up sloping surface 222 to increase its height, or platform 100 may be moved down sloping surface 222 to decrease its height. It is contemplated herein that the increase or decrease in the height of platform 100 may be accomplished by two methods, both of which provide equivalent results. The first is as described above, by moving platform 100. However, an equivalent result is achieved by placing activity surface 120 on an individual's lap, removing platform 100 from sloping surface 222 of support pad 200, moving support pad 200, either toward or away from the individual, and repositioning platform 100 on sloping surface 222 of support pad 200. This is the preferred method of adjusting the height of platform 100 because it does not require the device to be repositioned in a comfortable position for the individual after adjusting the height. More specifically, if platform 100 is moved up sloping surface 222 to increase the platform's height, then entire activity surface 120 most likely will have to be repositioned so that it is within a comfortable reach of the individual's hands. If support pad 200 is moved instead of platform 100, this additional adjustment of the entire device is not necessary.

As used herein, the "sloping surface" refers to a surface of support pad 200 (FIGS. 2a, 2b and 2c) that comes into contact with platform 100 and has a slope that allows platform 100 to be positioned at a position other than horizontal or level with resting surface 224 of support pad 200. Preferably, for every four inches of linear travel up sloping surface 222, there will be one inch of vertical rise. However, it is also contemplated that the range can be from two inches travel to one inch rise, all the way up to six inches travel for one inch rise. One skilled in the art understands however that other slopes are contemplated herein, so long as acceptable comfort and convenience of the device are maintained. It is also contemplated herein that in another embodiment, the sloping surface may indeed be parallel with the resting surface and therefore not actually have a slope at all. In this embodiment, the platform would rest flat, horizontal or level with the person's lap.

In a preferred embodiment, when the device is placed on the lap of an individual with the forward face pointing away from the individual, the height of the platform can be adjusted by repositioning the platform or support pad with respect to one another. For more extreme use configurations, one or more foam shims may be placed between the platform and the support pad to achieve a greater slope. These may be inserted for temporary use for a specific activity, or they may be attached with hook-and-loop fastening means. Also, due to the rigidity of platform 100, its leading edge 104 (FIGS. 2b and 2c) can be placed on the edge of a desk, table, or other structure so that the device can be further supported. Additionally, trailing edge 102 (FIGS. 2a and 2b) of platform 100, if the platform is adjusted such that trailing edge 102 if present, can be placed in an anchoring position in a person's lap.

When the hooks of the hook-and-loop fastening means on the underside of the platform come in contact with the fabric of the support pad, there is a gripping effect to help keep the support pad in contact with the platform. For a more permanent attachment, loop strips 29 (FIG. 1a) of the hook-and-loop fastening means can be affixed to support pad's 20 topside or sloping surface 22 in the same configuration as the hook strips on the platform. This allows platform 10 and support pad 20 to be mated at any point along the tracks.

The adjustability of the invention allow it to be used in abundant configurations and positions, as seen, for example, in FIGS. 3a through 3f. For example, the user can be seated in an upright position with the user's feet fully extended beneath with the ankles crossed or legs crossed. Alternatively, the user can be positioned in a leaning back position with any one of the above-described lower extremity positions.

A further aspect of this invention is in its adaptability as a device that can be easily accessorized for a multiplicity of purposes. While the platform itself can be used on any relatively level surface for a variety of purposes, and when combined with the support pad provides an adjustable, comfortable activity surface, its ability to receive and be configured with added components makes it especially desirable.

Figure 3A:
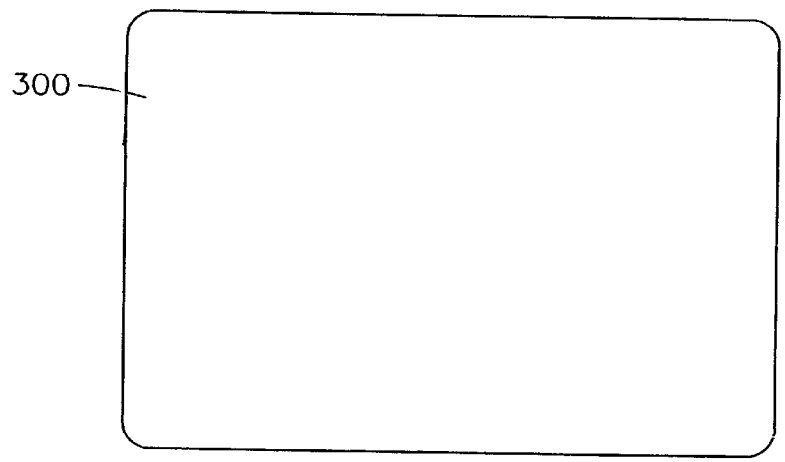
FIG. 3a shows an overhead view of the platform of the present invention.
Figure 3B:
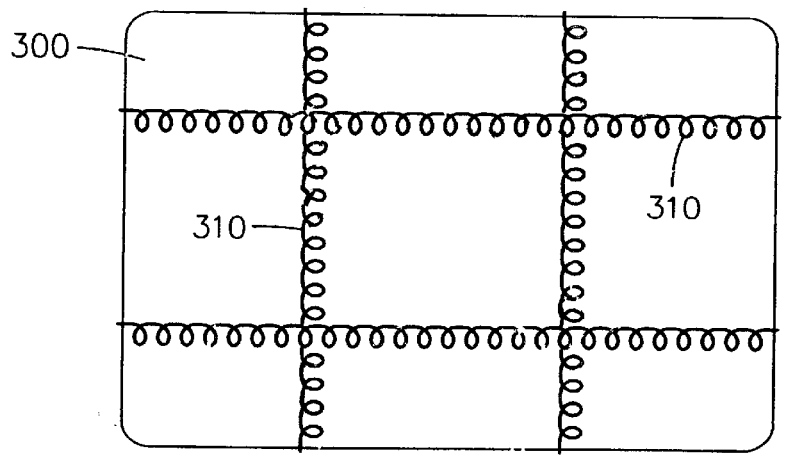
FIG. 3b shows an overhead view of the platform with attachment means for holding objects thereto.
Figure 3C:
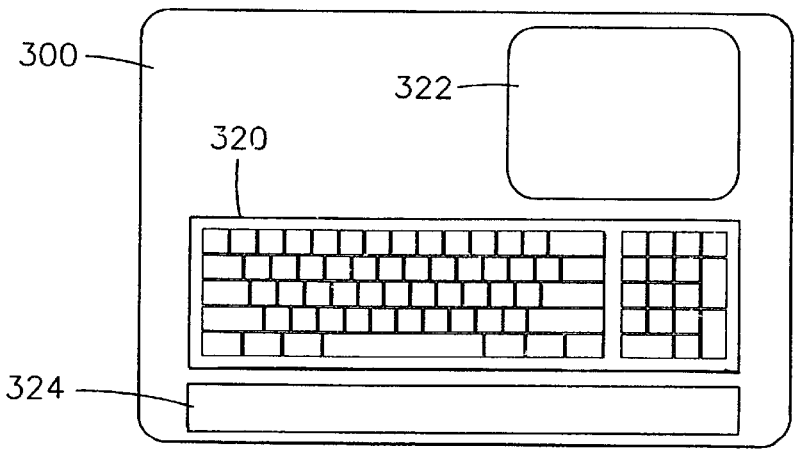
FIG. 3c shows an overhead view of the platform with a computer keyboard and mouse pad positioned thereon.
Figure 3D:
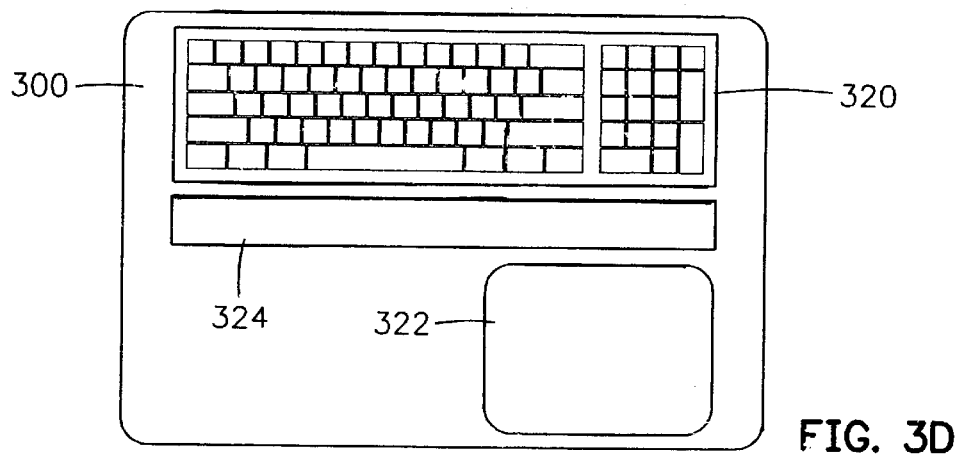
FIG. 3d shows an overhead view of the platform with an alternate anrangement of a computer keyboard and mouse pad thereon.
Figure 3E:
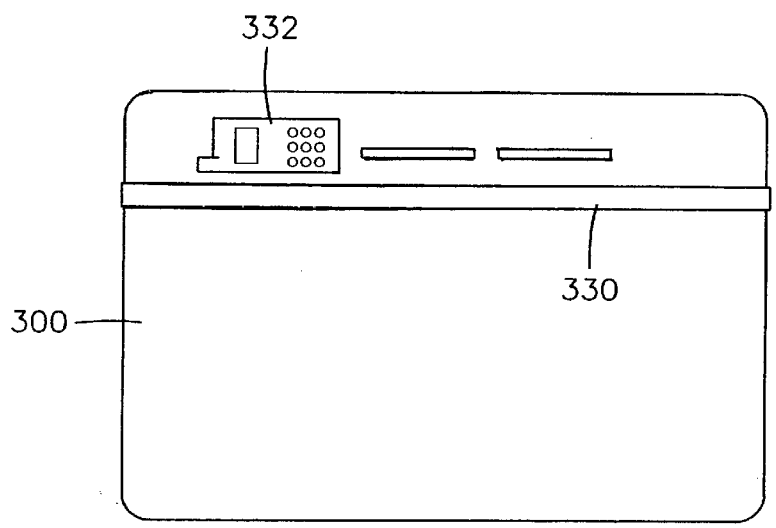
FIG. 3e shows an overhead view of the platform with an elastic cord thereon, for holding pencils or various objects thereon.

As seen in FIG. 3a, in its most basic form, the invention provides a smooth or flat surface or platform 300 for working with, for example, paper materials (documents, books, etc), crafts or other objects and items. In another embodiment, the device can be configured with a foam or rubber wrist rest 324 and/or a mouse and mouse pad 322 to provide a working surface for use with a computer keyboard 320 and/or mouse and mouse pad 322 while the invention is placed on the lap. This is shown in FIGS. 3c and 3d. Because the platform is preferably relatively thin, as described previously, the components added to the platform can then be temporarily held in place with rubber bands, elastic cords, nylon rope, leather belts, (any of which are represented by 310) or any other suitable holding or attachment means. This is seen in FIG. 3b. In FIG. 3e, elastic cord 330 holds various loose objects on platform 300. For a more permanent attachment, hook-and-loop straps can be employed to hold objects to the platform. The use of these holding or attachment means permits each component to be placed where ergonomically desirable and readily moved or removed with little difficulty. The bands or cords may be placed vertically, horizontally, or in any other desired configuration on the platform. The platform is also adapted to accept the use of paperclips, binderclips to hold materials to the surface.

Figure 3F:
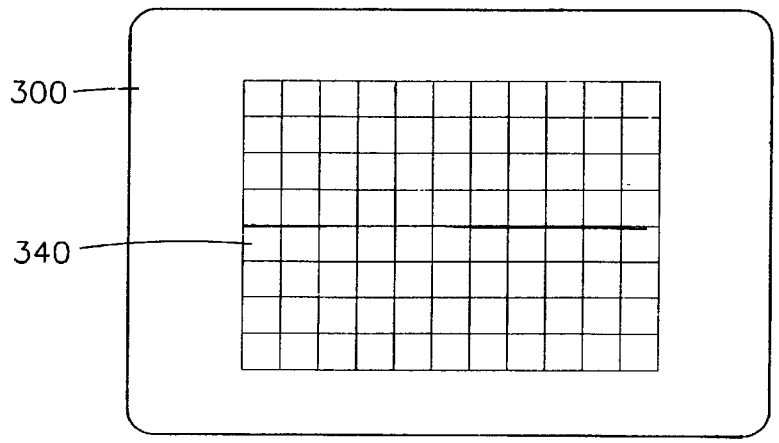
FIG. 3f shows an overhead view of the platform adapted for use with a game.

In further uses, the invention may be used for other more common activities, such as eating, in bed or on a chair, using a laptop computer, or playing board games where game outlines could be positioned on the platform. As seen in FIG. 3f, the platform can have grids 340 for performing a game. In additional embodiments, the platform can be magnetic or it can be a white board suitable for use with dry erase markers. Additionally, the invention is ideal for use for individuals confined to a bed or wheelchair, such as those in a hospital, long-term care facility or those who are disabled. Another feature of the invention is that it promotes good posture and ergonomics, thereby avoiding common repetitive-type injuries as well as carpal tunnel syndrome, which especially affects those who use computer keyboards in an incorrect posture. In a further embodiment, the activity surface further comprises a lap belt or lap strap for securing the device to the lap of an individual.

While the present invention has been illustrated and described by means of a specific embodiment, it is to be understood that numerous changes and modifications can be made therein without departing from the spirit and scope of the invention.

I claim:

1. An adjustable activity surface comprising:
    a support pad having a resting surface, a forward surface, a rearward surface and a sloping surface, wherein the support pad is thinner proximate to a user than distal to the user, and
    a platform supported by the sloping surface,
    wherein the height of the platform relative to the user can be increased by moving the platform up the sloping surface wherein the support pad is thicker, and the height of the platform can be decreased relative to the user by moving the platform down the sloping surface where the support pad is thinner, thereby providing adjustment of the activity surface to accommodate individual users.

2. The adjustable activity surface of claim 1, wherein the forward surface and the rearward surface are substantially parallel.

3. The adjustable activity surface of claim 1, wherein the platform has a surface area that is larger than a surface area of the sloping surface.

4. The adjustable activity surface of claim 1, wherein the support pad and the platform are held in contact by means selected from the group consisting of friction and hook-and-loop fasteners.

5. The adjustable activity surface of claim 1, further comprising attachment means for securing objects to the platform.

6. The adjustable activity surface of claim 5, wherein the attachment means are selected from the group consisting of elastic bands, rubber bands, nylon rope or leather belts.

7. The adjustable activity surface of claim 1, further comprising a lap belt or lap strap.

8. The adjustable activity surface of claim 1, wherein the platform further comprises a top surface that is flat.

9. The adjustable activity surface of claim 8, wherein the top surface of the platform is magnetic.

10. The adjustable activity surface of claim 8, wherein the top surface further comprises a white board.

11. An adjustable activity surface comprising:
 a support pad having a generally triangular or wedge configuration comprised of a resting surface, a forward surface and a sloping surface; and
 a platform in contact with the sloping surface,
wherein the height of the platform can be increased by moving the platform up the sloping surface distal to the user, and the height of the platform can be decreased by moving the platform down the sloping surface proximate to the user, thereby providing adjustment of the platform relative to the user.

12. The adjustable activity surface of claim 11, wherein the platform has surface area that is larger than a surface area of the sloping surface.

13. The adjustable activity surface of claim 11, wherein the support pad and the platform are held in contact by means selected from the group consisting of friction and hook-and-loop fasteners.

14. The adjustable activity surface of claim 11, further comprising attachment means for securing objects to the platform.

15. The adjustable activity surface of claim 14, wherein the attachment means are selected from the group consisting of elastic bands, rubber bands, nylon rope or leather belts.

16. The adjustable activity surface of claim 11, further comprising a lap belt or lap strap.

17. The adjustable activity surface of claim 11, wherein the platform further comprises a top surface that is flat.

18. The adjustable activity surface of claim 17, wherein the top surface of the platform is magnetic.

19. The adjustable activity surface of claim 17, wherein the top surface further comprises a white board.

20. A method of making and using an adjustable activity surface comprising,
 a) providing a support pad having a resting surface, a forward surface, a rearward surface and a sloping surface;
 b) contacting a platform with the sloping surface;
 c) placing the activity surface on an individual's lap;
 d) removing the platform from the sloping surface of the support pad;
 e) moving the support pad either toward or away from the individual; and
 f) repositioning the platform on the sloping surface of the support pad,
wherein an activity surface is provided that can be adjusted to a position that accommodates the size and preference of the individual.

* * * * *